United States Patent

Sparrow

[15] 3,638,153
[45] Jan. 25, 1972

[54] TRANSDUCER HAVING SINGLE LAYERED MAGNETOSTRICTIVE MEMBER

[72] Inventor: Hubert T. Sparrow, Minneapolis, Minn.
[73] Assignee: Honeywell Inc., Minneapolis, Minn.
[22] Filed: July 13, 1970
[21] Appl. No.: 54,261

[52] U.S. Cl. ..................................... 335/215, 251/129
[51] Int. Cl. .............................................. H01f 7/00
[58] Field of Search .............. 335/3, 215; 251/129; 137/495, 137/489

[56] References Cited

UNITED STATES PATENTS 3,414,010   12/1968   Sparrow ........................ 251/129 X
3,288,942   11/1966   Voegeli ......................... 335/215 X Primary Examiner—George Harris
Attorney—Lamont B. Koontz

[57] ABSTRACT

A magnetomechanical transducer utilizing a single layered magnetostrictive member. A biasing means causes a strain in the magnetostrictive material which gives rise to compressive and tensile stresses in the member. The coefficient of magnetostriction increases or decreases in portions of the member depending on the nature of the stress in the portion. When the member is subjected to a magnetic field the member will deflect as a result of the changed coefficient of magnetostriction.

9 Claims, 8 Drawing Figures

PATENTED JAN 25 1972

CHANGE IN STRAIN = $+\frac{2}{3}\lambda$

CHANGE IN STRAIN = $-\frac{1}{3}\lambda$ $\lambda_s - \frac{2}{3}\lambda$ $\lambda_s + \frac{1}{3}\lambda$

INVENTOR.
HUBERT T. SPARROW

BY *Thomas B. Kroon*

ATTORNEY.

PATENTED JAN 25 1972

INVENTOR.
HUBERT T. SPARROW
BY
ATTORNEY.

TRANSDUCER HAVING SINGLE LAYERED MAGNETOSTRICTIVE MEMBER

BACKGROUND OF THE INVENTION

This invention relates generally to a magnetomechanical transducer which utilizes a magnetostrictive material. More specifically this invention relates to a transducer utilizing a single layered magnetostrictive member.

Many prior art devices, such as the type described in Sparrow U.S. Pat. No. 3,414,010, utilize multilayered magnetostrictive materials. These multilayered magnetostrictive members generally comprise two layers bonded together, one layer having a positive coefficient of magnetostriction and the other layer having a negative coefficient. The deflection of such a magnetostrictive member is a function of the force of a magnetic field applied. Generally this magnetic field is applied by means of a coil or electromagnet means.

Prior art devices also include trimetals wherein a third layer of material has a thermal expansion coefficient matched to that of one of the bimetal layers in order to provide temperature compensation.

While such prior art devices have proved to be very useful, all have had the inherent disadvantage of requiring the bonding together of materials to obtain bimetals or trimetals in order to have deflection and/or avoid temperature related errors. The instant invention, however, obviates bonding metals together insofar as a deflection of the magnetostrictive material is obtained even though only a single-layered member is used. In addition because only a single layer of material is used, the device is inherently temperature compensated, requiring no additional means or layers to preclude temperature effects. The instant invention also has inherent variable hysteresis so that by a simple and expedient adjustment of any device utilizing this invention, the hysteresis may be varied so that it may be either positive or negative.

More advantages will become apparent upon a reading of the following descriptions of the instant invention in view of the accompanying drawing.

SUMMARY OF THE INVENTION

The transducer of this invention utilizes a material with a high, positive or negative coefficient of magnetostriction. When a strip or piece of this material is bent, tensile stresses are set up in one-half of the strip balanced by compressive stresses in the other half. For a positive magnetostrictive material, the magnetostriction coefficient of the material in tension is decreased relative to unstrained material, while the material having compressive stresses has its magnetostriction coefficient increased. If then the strained strip of magnetostrictive material is subjected to a magnetic field along its length and the material has a positive coefficient of magnetostriction, it will tend to straighten or deflect in opposition to the strain. If the material has a negative coefficient of magnetostriction, the strip will likewise tend to straighten or deflect in opposition to the strain since the material supporting the highest tensile stresses will have the greatest negative coefficient of magnetostriction. This change in flexure is linearly related to the magnetic flux density in the material. Thus, the device lends itself to use as a magnetomechanical transducer.

Any magnetization process of such a material involves some hysteresis so that the flexure of the magnetostrictive cantilever in any given applied field will depend on whether the field is increasing or decreasing. In the instant invention this hysteresis may be controlled by altering the load applied to strain or bend the magnetostrictive member. By varying the load on the member above or below a given level, the hysteresis may be made to be positive or negative. This variable hysteresis is thought to result from a balancing of the magnetic hysteresis which inheres in the application of a magnetic field, and mechanical hysteresis, known as the Bauschinger effect, which is known to occur in metals under certain conditions.

DETAILED DESCRIPTION OF THE INVENTION

This invention utilizes the fact that when a strip of magnetostrictive material is subjected to a strain, so that a portion thereof is in tension and another portion is in compression, and thereafter a magnetic field is applied to the magnetostrictive material, the material tends to flex or deflect. As aforementioned this is the result of the increase and decrease in the coefficient of magnetostriction in the material supporting compressive and tensile stresses.

Figure 1:
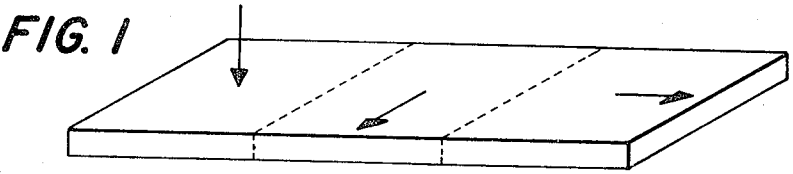
FIG. 1 is an illustration of a piece of magnetostrictive material schematically showing the orientation of magnetic domains in the material.
Figure 2:
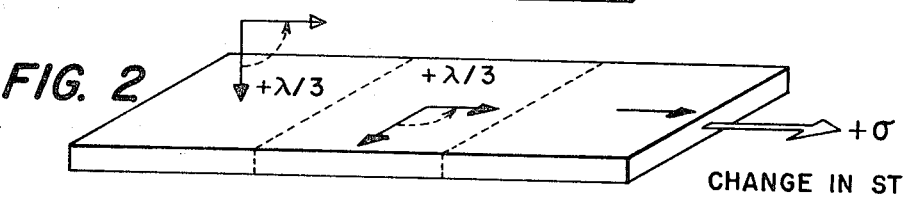
FIG. 2 is an illustration of a piece of magnetostrictive material subjected to a tensile stress and the effect on magnetic domains as a result of the stress.
Figure 3:
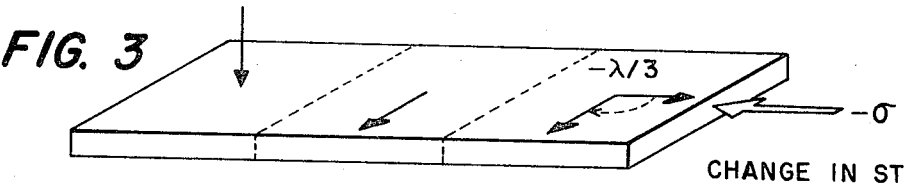
FIG. 3 is a similar illustration showing the effects of a compressive stress.

A demagnetized strip of positive magnetostrictive material has its magnetic domains directed effectively at random. One may approximate the distribution of orientations of the magnetic domains as one-third aligned along the strip, one-third across and one-third through the thickness of the strip as shown in FIG. 1. If this strip is subjected to a tensile stress $\sigma$, as shown in FIG. 2, the magnetic domains will tend to align in the stressed direction. Because there are two directions perpendicular to the line of application of the stress, the change in strain in the material will be $\frac{2}{3} \lambda$, where $\lambda$ is the magnetostrictive strain. On the other hand if a strip is subjected to a compressive stress, as shown in FIG. 3, the magnetic domains will tend to align at right angles to the direction of the application of the stress. Because there are two mutually perpendicular directions both perpendicular to the line of application of the stress, there is a change of only $\frac{1}{3} \lambda$ in the magnetostrictive strain in the material in compression.

Figure 4:
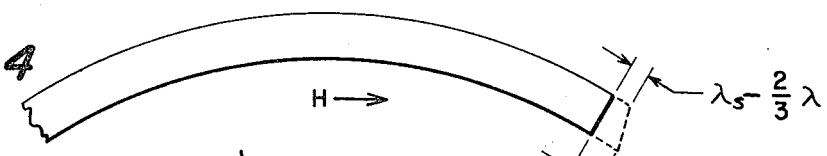
FIG. 4 is an illustration showing the dimensional changes in a strained beam of magnetostrictive material when subjected to a magnetic field.

As is well known, a beam or a strip of material, when bent, has one side in compression and one side in tension. As illustrated in FIG. 4, when a bent strip or beam of magnetostrictive material having a positive coefficient of magnetostriction is subjected to a magnetic field H, where $\lambda_s$ is the maximum possible magnetostriction, then the change in strain in the portion of the beam in tension will be $\lambda_s - \frac{2}{3}\lambda$. On the other hand the change in strain of the portion of the beam in compression will be $\lambda_s - (-\frac{1}{3}\lambda)$ or $\lambda_s + \frac{1}{3}\lambda$. Hence there is a greater change in strain on the one side of the beam then on the other side and the beam will consequently tend to straighten out. This change in flexure tends to be linearly related to the magnetic flux thus enabling the device to work as a magnetomechanical transducer.

Figure 5:
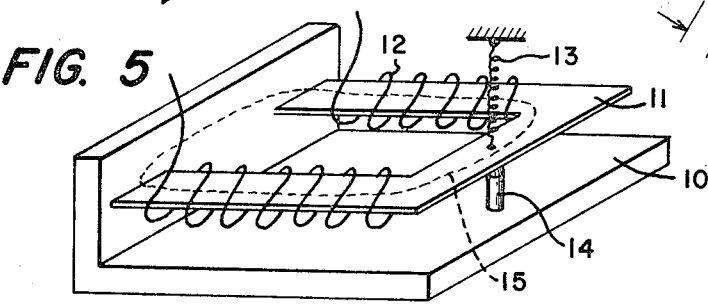
FIG. 5 is one embodiment of a pneumatic flapper valve utilizing the invention.

FIG. 5 is an illustration of a pneumatic flapper valve utilizing the subject invention. To a base 10 is attached a magnetostrictive U-shaped beam or element 11 in a cantilevered fashion. Electromagnet means or coils 12 are wound about the element 11 to provide a magnetic field. A means for producing a strain in the magnetostrictive element is provided by a spring 13. The magnetic flux circuit or path provided is indicated by the dotted line 15. When the coils 12 are energized the element 11 which is normally biased upwards by the spring 13 tends to straighten out and close off the nozzle 14. As the current through the coils 12 is varied, the deflection of the element 11 varies in a basically linear relation so that the output pressure from the nozzle 14 is basically a linear function of the current input to the coil 12, (i.e., as linear as is the used portion of the magnetization curve for the material used.) Obviously the construction illustrated in FIG. 5 may be used as an electric relay by replacing the nozzle 14 with suitable electrical contacts.

Figure 6:
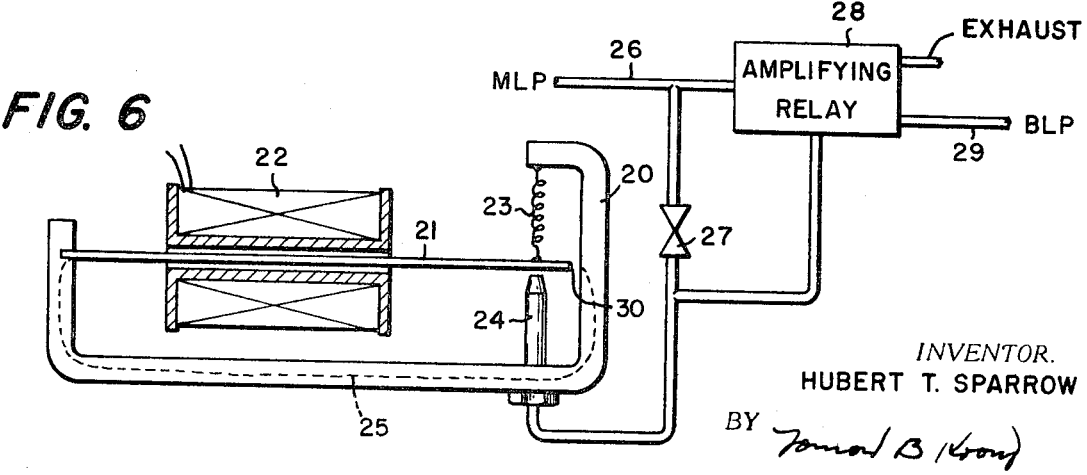
FIG. 6 is another embodiment of a pneumatic valve utilizing the subject invention.

FIG. 6 illustrates a second embodiment of a pneumatic flapper valve of the type shown in FIG. 5. A strip or beam of magnetostrictive material 21 is cantilevered to a base 20 and has cooperating therewith an electromagnet means or coil 22. The magnetostrictive element 21 in FIG. 6 is a simple beam as opposed to a U-shaped member depicted in FIG. 5 so that the magnetic flux path 25 in FIG. 6 includes an airgap 30. A biasing means in the form of a spring 23 is attached to the base 20 to provide the necessary strain in the element 21. Because the relationship between the input current to the coil 22 and the output pressure is not exactly linear, but describes a slight S-shaped curve in a plot of output pressure versus input coil current, an amplifying relay 28 is utilized to take advantage of the substantially linear portion of the curve. Fluid pressure is supplied via conduit 26 and thereafter passes through a restriction 27 to nozzle 24. Pressure is also supplied to the amplifying relay 28. As current is supplied to the coil 22 the element 21 moves in opposition to the strain imposed on the element by spring 23 so as to close off the nozzle 24 and thereby increase the pressure output at 29. This output may be used to actuate a valve or the like.

Figure 7:
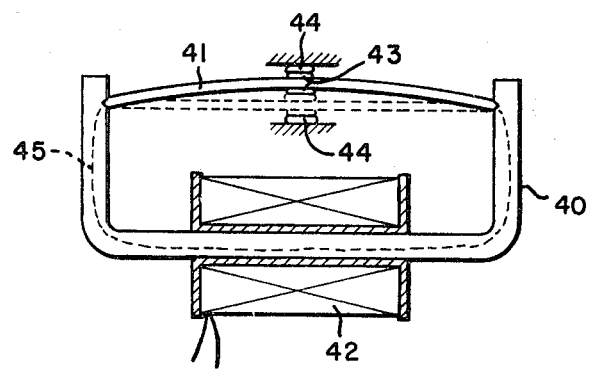
FIG. 7 is an illustration of an electric relay utilizing the subject invention.

FIG. 7 illustrates how the instant invention may be utilized to provide an electric relay. Here a U-shaped member 40 of a magnetic material carries between the two legs of the U-shaped member a magnetostrictive element 41. Because the distance between the two legs is less than the length of the magnetostrictive element 41, the element is continually in a state of strain. A coil 42 provides the magnetic field which will cause the deflection of the element 41 upon the application of current to the coil 42. The magnetic flux path is described by the dotted line 45. Two contacts 44 are provided as well as a common contact 43 carried by the element 41.

Figure 8:
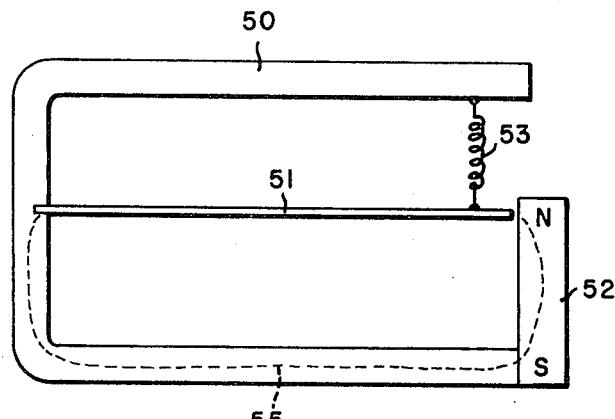
FIG. 8 illustrates the use of a permanent magnet in the subject invention in place of an electromagnet.

Still another embodiment of the subject invention is illustrated in FIG. 8. Here a permanent magnet 52 is used as opposed to an electromagnet or the like as in the earlier described embodiments. A base member or the like 50 carries the magnetostrictive element 51 as well as means 53, in the form of a spring, to provide a strain in the element 51. When the permanent magnet 52 is located so as to complete a magnetic flux circuit 55 through the base 50 and the magnetostrictive element 51, the element 51 will deflect. This deflection may be utilized to close off a nozzle or to serve as a pick off means, indication means or the like in response to the proximity of the permanent magnet 52.

In all of the embodiments above described the magnetostrictive element is in a strained or bent condition prior to the application of a magnetic field. When the magnetic field is applied the beam or element tends to straighten out whether a positive or negative magnetostrictive material is used. When the magnetic field is removed the beam tends to recover its original flexure or bent attitude. Often times its original flexure will not be fully recovered because of the magnetic hysteresis in the element. Hence the element remains straighter than it originally was. As mentioned earlier it has been found that this hysteresis may be controlled by varying the load which provides the strain in the element. This effect is thought to be a result of mechanical hysteresis.

Mechanical hysteresis is known to occur in metals under certain conditions. This effect has two principal characteristics: it only occurs in metals stressed somewhat beyond yield; and, the magnitude of the affect is greater, the greater the amount of prestrain. Hence if a beam such as beam 21 in FIG. 6 is properly treated by means of prestraining and annealing, and if a biasing means such as spring 23 in FIG. 6 produces a sufficient stress in the beam 21 so that the yield point is slightly exceeded, when the beam is straightened from its flexed position, it may, when allowed to resume its flexed position, assume a greater flexure. This additional flexure may, if the stress applied to the beam by means of spring 23 is optimally selected, closely counteract the magnetic hysteresis effect of the magnetization cycle so that the combined hysteresis or net change in flexure tends to be zero.

By increasing or decreasing the stress above or below this critical level, one may obtain either negative or positive hysteresis in the transducer. Using nonoriented polycrystalline sheets of Hyperco 50, an alloy of iron, cobalt and vanadium which has a high positive coefficient of magnetostriction, it has been found that prestressing the Hyperco 50 to 16,000 p.s.i., followed by annealing, results in the exhibition of yield in the element at stresses as low as 4,000 p.s.i. With this treatment it has been found that the critical stress level is approximately 12,000 p.s.i. Increasing the load above 12,000 p.s.i. yields a negative hysteresis curve in the transducer while decreasing it below 12,000 p.s.i. results in a positive hysteresis curve. These figures are intended to be indicative only for there are many variables and the exact results will be functions of the conditions present.

It is clear that the instant invention has many applications and uses beyond those actuator and indicator functions disclosed herein. Accordingly it is intended that the scope of the invention be determined only by the appended claims.

The embodiments of the invention in which an exclusive property or right is claimed are defined as follows:

1. A transducer comprising:
   a single layered member of magnetostrictive material having a predetermined coefficient of magnetostriction;
   means for producing a strain and for establishing both compressive and tensile stresses in the member and thereby altering the coefficient of magnetostriction in portions of the member;
   means for applying a magnetic field to establish a magnetic flux path through said magnetostrictive member;
   said magnetostrictive member deflecting in response to the application of the magnetic field, the deflection being a function of the strain produced in the magnetostrictive member.

2. A transducer according to claim 1 further comprising a base, said magnetostrictive member being deflectively carried by said base.

3. A transducer according to claim 2 wherein said means for producing a strain comprises spring means.

4. A transducer according to claim 3 wherein said magnetostrictive means comprises a beam, one end of said beam being deflectively carried by said base.

5. A transducer according to claim 1 wherein said means for applying a magnetic field comprises electromagnet means, said magnetostrictive member deflecting in response to varying current in the electromagnet means and in opposition to the strain imposed on the member.

6. A transducer according to claim 1 additionally comprising means for adjustably varying the strain in said magnetostrictive member whereby hysteresis in said magnetostrictive member is adjustably varied.

7. A transducer comprising:
   a valve member having fluid passage means therethrough;
   a single layered magnetostrictive member having a portion thereof movable with respect to said valve member for controlling flow through said passage;
   means for producing a strain in the magnetostrictive member;
   electromagnet means for applying a magnetic field to establish a flux path through said magnetostrictive member;
   said magnetostrictive member deflecting in response to varying current in the electromagnet means and as a function of the strain produced in the magnetostrictive member.

8. A transducer as in claim 7 wherein one end of said magnetostrictive member is rigidly attached to means connected to said valve member and the other end of said magnetostrictive member is movable with respect to said valve member.

9. A transducer as in claim 8 wherein the means connecting the attached end of the magnetostrictive member and the valve member is at least in part formed of magnetic material and forms part of a flux path extending through said magnetostrictive member.

* * * * *